US012689402B2

(12) United States Patent  
Hörberg et al.

(10) Patent No.: US 12,689,402 B2  
(45) Date of Patent: Jul. 21, 2026

(54) GENERATION OF RADIO FREQUENCY IN MICROWAVE RADIO LINKS

(71) Applicant: Telefonaktiebolaget LM Ericsson (publ), Stockholm (SE)

(72) Inventors: Mikael Hörberg, Torslanda (SE); Cristian Czegledi, Gothenburg (SE); Jan Sandberg, Frillesås (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 459 days.

(21) Appl. No.: 18/003,833

(22) PCT Filed: Jul. 8, 2020

(86) PCT No.: PCT/EP2020/069234  
§ 371 (c)(1),  
(2) Date: Dec. 29, 2022

(87) PCT Pub. No.: WO2022/008046  
PCT Pub. Date: Jan. 13, 2022

(65) Prior Publication Data  
US 2023/0261686 A1    Aug. 17, 2023

(51) Int. Cl.  
*H04B 1/40*        (2015.01)  
*H04W 72/0453*   (2023.01)  
*H04B 7/0413*     (2017.01)

(52) U.S. Cl.  
CPC .......... *H04B 1/40* (2013.01); *H04W 72/0453* (2013.01); *H04B 7/0413* (2013.01)

(58) Field of Classification Search  
CPC .............................. H04B 1/40; H04W 72/0453  
See application file for complete search history.

(56) References Cited

U.S. PATENT DOCUMENTS 5,574,986 A * 11/1996 Mobach ................... H04B 1/40  
                                                                     455/260  
9,391,452 B1 * 7/2016 Cousinard ........... H02J 13/1323  
                                    (Continued)

FOREIGN PATENT DOCUMENTS

WO        2019233571 A1    12/2019

OTHER PUBLICATIONS

International Search Report and Written Opinion dated Mar. 24, 2021 for International Application No. PCT/EP2020/069234 filed Jul. 8, 2020, consisting of 8 pages.  
(Continued)

*Primary Examiner* — Zhiren Qin  
(74) *Attorney, Agent, or Firm* — Weisberg I.P. Law, P.A.

(57)        ABSTRACT

A microwave radio system and a method of generating an operational frequency in the microwave radio system. The microwave radio system includes at least one radio link. Each radio link has one or more radio unit(s). Each radio link has a common local oscillator (LO) which is configured to transmit a common LO frequency signal to each of the radio units of each radio link. Each radio link has a respective joint transmission line arranged to be coupled to each respective radio unit and configured to carry a plurality of signals comprising the common LO frequency signal to each of the respective radio units of each radio link. The common LO is arranged remotely from the one or more radio unit(s) and each radio unit is configured to receive and convert the transmitted common frequency signal of the common LO to an operational radio frequency of each radio unit.

19 Claims, 7 Drawing Sheets

(56)  References Cited

U.S. PATENT DOCUMENTS

| | | | | |
|---|---|---|---|---|
| 10,659,138 | B1 * | 5/2020 | Shahmohammadian | .................... H04B 7/0434 |
| 2005/0064892 | A1 | 3/2005 | Cavin | |
| 2006/0007908 | A1 * | 1/2006 | Hosur | ................. H04L 27/2613 370/503 |
| 2013/0243113 | A1 * | 9/2013 | Taghivand | ................ H03L 7/20 375/295 |
| 2014/0134961 | A1 * | 5/2014 | Morris | ................... H04B 1/403 455/76 |
| 2015/0326317 | A1 * | 11/2015 | Michaelis | ............ H04B 10/807 398/115 |
| 2016/0028163 | A1 * | 1/2016 | Li | .......................... H01Q 21/28 343/893 |
| 2016/0095116 | A1 * | 3/2016 | Jackson | ............ H04W 72/0453 370/315 |
| 2016/0182104 | A1 * | 6/2016 | Xue | ..................... H04J 11/0056 455/78 |
| 2017/0319135 | A1 * | 11/2017 | Ma | ........................ H04W 88/06 |
| 2019/0104212 | A1 * | 4/2019 | Lee | ...................... H01Q 9/0435 |
| 2021/0007213 | A1 * | 1/2021 | Ryu | ...................... H05K 1/028 |
| 2021/0044987 | A1 * | 2/2021 | Huo | ..................... H04W 24/08 |

OTHER PUBLICATIONS

P. Larsson, "Lattice Array Receiver and Sender for Spatially OrthoNormal MIMO Communication;" 2005 IEEE 61st Vehicular Technology Conference, 2005, pp. 192-196 vol. 1, consisting of 5 pages.
M. Sjodin et al., "A 40.2 bps/Hz Single Polarization 4x4 Line-of-Sight MIMO Link With Unsynchronized Oscillators;" 2019 IEEE Radio and Wireless Symposium (RWS), 2019, pp. 1-3, consisting of 3 pages.

* cited by examiner

501. Transmit a common frequency signal of a remote local oscillator to a radio unit comprised in a radio link 503. Receive in each radio unit the transmitted LO frequency 505. Convert the received common frequency of the local oscillator to operation frequency of the radio unit

GENERATION OF RADIO FREQUENCY IN MICROWAVE RADIO LINKS

CROSS-REFERENCE TO RELATED APPLICATIONS

This application is a Submission Under 35 U.S.C. § 371 for U.S. National Stage Patent Application of International Application Number: PCT/EP2020/069234, filed Jul. 8, 2020 entitled "GENERATION OF RADIO FREQUENCY IN MICROWAVE RADIO LINKS," the entirety of which is incorporated herein by reference.

TECHNICAL FIELD

The present invention relates to apparatuses and method involving the field of wireless communication networks, and more specifically to microwave backhaul using point-to-point line-of-sight (LOS) communication links.

BACKGROUND

Microwave backhaul communication systems using point-to-point line-of-sight (LOS) links in future telecommunication systems are expected to experience higher demands on data rates to support the increasingly higher mobile data traffic. Multiple-Input-Multiple-Output (MIMO) is a technology that can be used to support this high data-rate demand. MIMO adds new dimensions to increase the spectral efficiency in point-to-point links by utilizing parallel spatial data streams on the same frequency band. In order to maximize performance, for each specific link, there exists an optimal geometric antenna deployment such that the capacity of the link is maximized. This deployment depends on the number of antennas, link separation distance and the hop length.

In practice however, it is not always possible to deploy the antennas according to the optimal deployment. For example, in a squared four-stream antenna system, i.e., a 4×4 MIMO, the optimum antenna separation is calculated to be around 13 meters if the carrier frequency is 18 GHz for the hop length of 20 km, which can be problematic to accommodate for such a deployment. On the other hand, suboptimal antenna deployments result in a penalty on system gain, throughput and availability. This loss in performance can be reduced by applying a signal processing technique called precoding. In some cases, e.g. at low antenna separation (<40% of optimal separation), the capacity obtained with precoding is doubled compared to deployment scenarios without using precoding. However, in order for precoding to work efficiently, there are some strict requirements imposed on the radio links and operation of the MIMO systems. Many of the current microwave systems use local oscillators in the radio units of the MIMO in a way which makes it nearly impossible to apply and execute precoding properly for an optimum deployment scenario.

Therefore, there is a need to design more robust and efficient point-to-point line-of-sight MIMO communication links to handle the future demands on the increasing data traffic and optimum antenna deployment in high performance wireless communication systems.

SUMMARY

It is an object of the present disclosure to set forth a microwave radio system, radio units and a method for addressing at least some of the shortcomings in the optimum deployment of the MIMO systems using precoding.

These objects are achieved by means of several aspects of the present invention defined in the appended claims. According to a first aspect of the present disclosure, there is provided a microwave radio system, comprising at least one radio link, wherein each radio link comprises one or more radio unit(s), and each radio unit comprises a transceiver unit configured to transmit and/or receive a wireless signal, wherein the transceiver unit comprises: a receiving module, and a transmitting module. Each radio unit comprises a signal processing unit configured to process the wireless signal being transmitted and/or received by the transceiver unit and an antenna element for transmitting and/or receiving the wireless signal, wherein the antenna element is arranged to be coupled to an antenna port of the transceiver unit. Each radio link further comprises a common local oscillator (LO) configured to transmit a common LO frequency signal of the common LO to each of the radio units of each radio link and a respective joint transmission line arranged to be coupled to each respective radio unit. The joint transmission line is configured to carry a plurality of signals comprising the common LO frequency signal of the common LO to each of the respective radio units of each radio link. The common LO is arranged remotely from the one or more radio unit(s) of each radio link. Each radio unit is configured to receive and convert the transmitted common frequency signal of the common LO, to an operational radio frequency of each radio unit. The signal processing unit of each radio unit is configured to convert the transmitted common frequency signal of the common LO, to the operational radio frequency of each radio unit.

In some embodiments, the signal processing unit may further comprise at least one frequency mixer element which is configured to produce an output signal based on the operational radio frequency of each radio unit. The mixer element may be configured to produce the output signal by operating on the transmitted and/or received signals and the operational radio frequency of each radio unit. The operational radio frequency of each radio links may be the same as the operational radio frequency of each radio unit. In some embodiments, the signal processing unit may further comprise at least one multiplier element configured to multiply the common frequency signal of the common LO by a predetermined multiplication factor. The multiplied common frequency signal of the common LO may be the operational radio frequency of each unit. In some embodiments, the common frequency signal of the common LO may comprise a sub-harmonic frequency of the LO frequency. It is found by the inventors that by distributing the LO of the MIMO links as a common LO, strict requirements of applying precoding for optimum deployment of MIMO antennas can be fulfilled. More specifically, the apparatuses and methods in the present disclosure provide a high degree of synchronization among the MIMO streams by sharing a common LO, producing the operation radio frequency of each radio unit based on the common frequency of the common LO and thus enable significant correlation of phase noise among the MIMO streams.

In some embodiments, the signal processing unit may further comprise a modulation/demodulation unit configured to modulate and/or demodulate transmitted and/or received signals in each radio unit.

In some example embodiments, the respective joint transmission line may be further configured to carry a power signal and/or a control signal to each of the one or more radio unit(s).

In some embodiments, each radio link may further comprise a baseband unit and the common LO may be deployed in the baseband unit. The baseband unit may be located at a remote location from the one or more radio unit(s) of each radio link.

According to some other embodiments, the respective joint transmission line, may be further configured to carry a data stream, transmitted from the baseband unit toward each of the one or more radio unit(s), and/or received from each of the one or more radio unit(s) at the baseband unit. In various embodiments, the respective joint transmission line may be an intermediate frequency (IF) cable.

The baseband unit in some embodiments may further comprise at least one filter unit coupled to the common LO. Each filter unit may be configured to filter i.e. separate the common frequency signal of the common LO from the plurality of signals carried by the joint transmission line (from the baseband unit toward the radio units). In various embodiments, the baseband unit may further comprise at least one receiver filter unit and at least one transmitter filter unit. The receiver filter unit may be configured to separate, from the plurality of signals carried by the joint transmission line (from the radio units toward the baseband unit), the data stream received from each of the one or more radio unit(s) at the baseband unit. The transmitter filter unit may be configured to separate, from the plurality of signals carried by the joint transmission line (from the baseband unit toward the radio units), the data stream transmitted from the baseband unit toward each of the one or more radio unit(s).

According to some embodiments, each radio unit may further comprise at least one filter unit for the common LO frequency corresponding to the at least one filter unit of the baseband unit. Each filter unit may be configured to separate the common frequency signal of the common LO from the plurality of signals carried by the joint transmission line. By corresponding here it is to be construed that when a filter unit is used to separate the common frequency signal of the common LO in the baseband unit, another filter with characteristics and specifications corresponding to the filter used in the baseband unit is also used in each radio unit. The filter units thus may operate in the same frequency range and/or be identical. The same applies for the receiver and transmitter filter units in the baseband unit and in each radio unit.

In various embodiments, each radio unit may further comprise at least one receiver filter unit and at least one transmitter filter unit, corresponding to the at least one receiver filter unit and the at least one transmitter filter unit of the baseband unit. The receiver filter unit may be configured to separate, from the plurality of signals carried by the joint transmission line (from the radio units toward the baseband unit), the data stream transmitted from each of the one or more radio unit(s) toward the baseband unit. The transmitter filter unit may be configured to separate, from the plurality of signals carried by the joint transmission line (from the baseband unit toward the radio units), the data stream received from the baseband unit at each of the one or more radio unit(s).

In several embodiments, each radio link may comprise a first common LO, and a second common LO, wherein the first common LO may be a receiver common LO having a first common LO frequency for the received signal and the second common LO may be a transmitter common LO having a second common LO frequency for the transmitted signal, wherein the first common LO frequency may be different from the second common LO frequency. In several embodiments, the first common LO may be a receiver common LO for the receiving module and the second common LO may be a transmitter common LO for the transmitting module.

In several embodiments, each radio unit may further comprise a first multiplier element, and a second multiplier element. The first multiplier element may be a receiver multiplier element, configured to operate on the first common LO frequency of the first common LO for the received signal. The second multiplier element may be a transmitter multiplier element, configured to operate on the second common LO frequency of the second common LO for the transmitted signal, wherein the first common LO frequency may be different from the second common LO frequency.

In various embodiments, the microwave radio system may be a line-of-sight, LOS, multi-stream multi-input multi-output, MIMO microwave backhaul communication system.

According to a second aspect of the present disclosure, there is provided a radio unit comprising a transceiver unit configured to transmit and/or receive a wireless signal. The transceiver unit comprises a receiving module, a transmitting module, and an antenna port. The radio unit further comprises a signal processing unit configured to process the wireless signal being transmitted and/or received by the transceiver unit, an antenna element for transmitting and/or receiving the wireless signal, wherein the antenna element is arranged to be coupled to the antenna port of the transceiver unit. The radio unit is arranged remotely from a common local oscillator (LO). The radio unit is arranged to be coupled to a joint transmission line and is configured to receive a common frequency signal of the common LO from the common LO via the joint transmission line. Wherein the signal processing unit is configured to convert the received common frequency signal of the common LO to an operational radio frequency of the radio unit.

According to a third aspect of the present disclosure, there is provided a method for generating an operational radio frequency in a microwave radio system, wherein the microwave radio system comprises at least one radio link and each radio link comprises one or more radio unit(s) according to the second aspect of the present disclosure. Each radio link further comprises a common local oscillator (LO) and a respective joint transmission line arranged to be coupled to each respective radio unit. The respective joint transmission line is configured to carry a plurality of signals. The method comprises transmitting, over the respective joint transmission line, a common frequency signal of the common LO to each of the respective radio units of each radio link. The method further comprises receiving, in each radio unit, the transmitted common frequency signal of the common LO and converting, in each radio unit, the received common frequency signal of the LO to the operational radio frequency of each radio unit. The common LO is arranged remotely from the one or more radio unit(s) of each radio link.

Accordingly the features, functionalities and advantages achieved by the first aspect of the present disclosure analogously apply to the second and third aspects of the present disclosure.

In several embodiments the common frequency signal of the common LO may comprise a sub-harmonic frequency of the LO frequency. In some embodiments the converting of the received common frequency of the common LO to the operational frequency of each radio unit may comprise multiplying the received common frequency signal of the common LO by a predetermined multiplication factor. In various embodiments, the multiplication factor may be determined based on at least one of: radio link operation frequency, degree of phase noise correlation of the at least one radio link, the MIMO order, baud rate and phase noise strength of the microwave radio system.

DETAILED DESCRIPTION

Figure 1A:
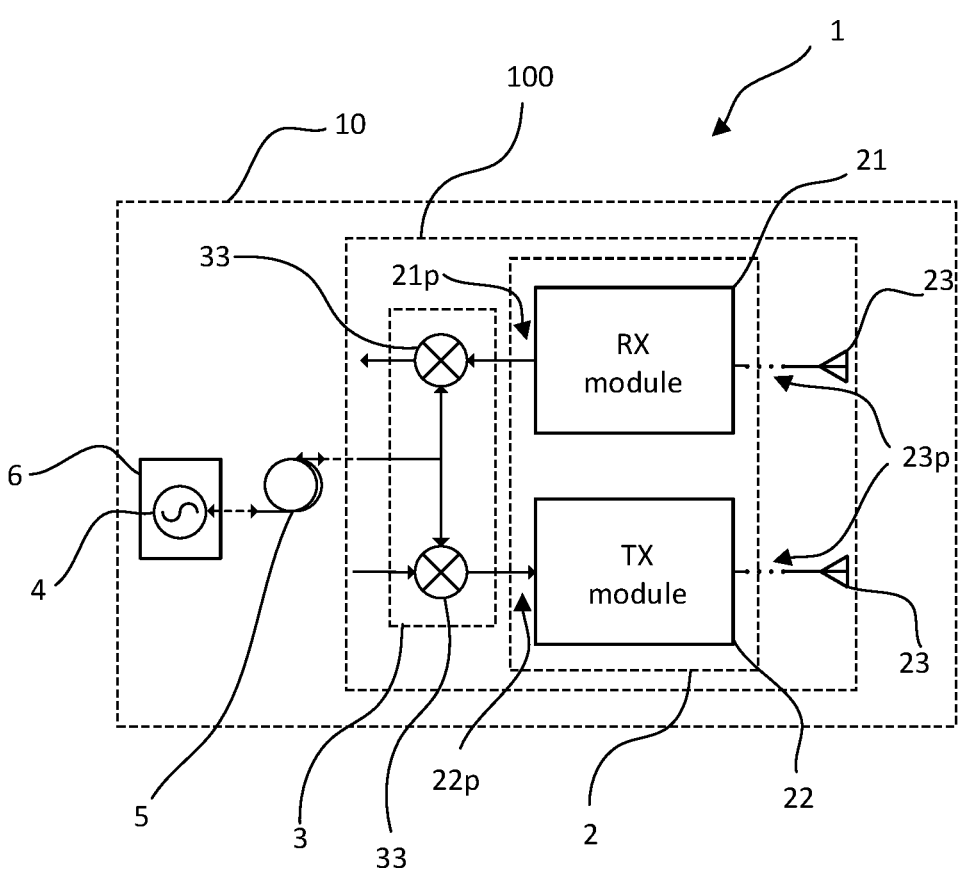
FIGS. 1A-1E show schematic diagrams of a microwave radio system according to some embodiments of the present disclosure.
Figure 1B:
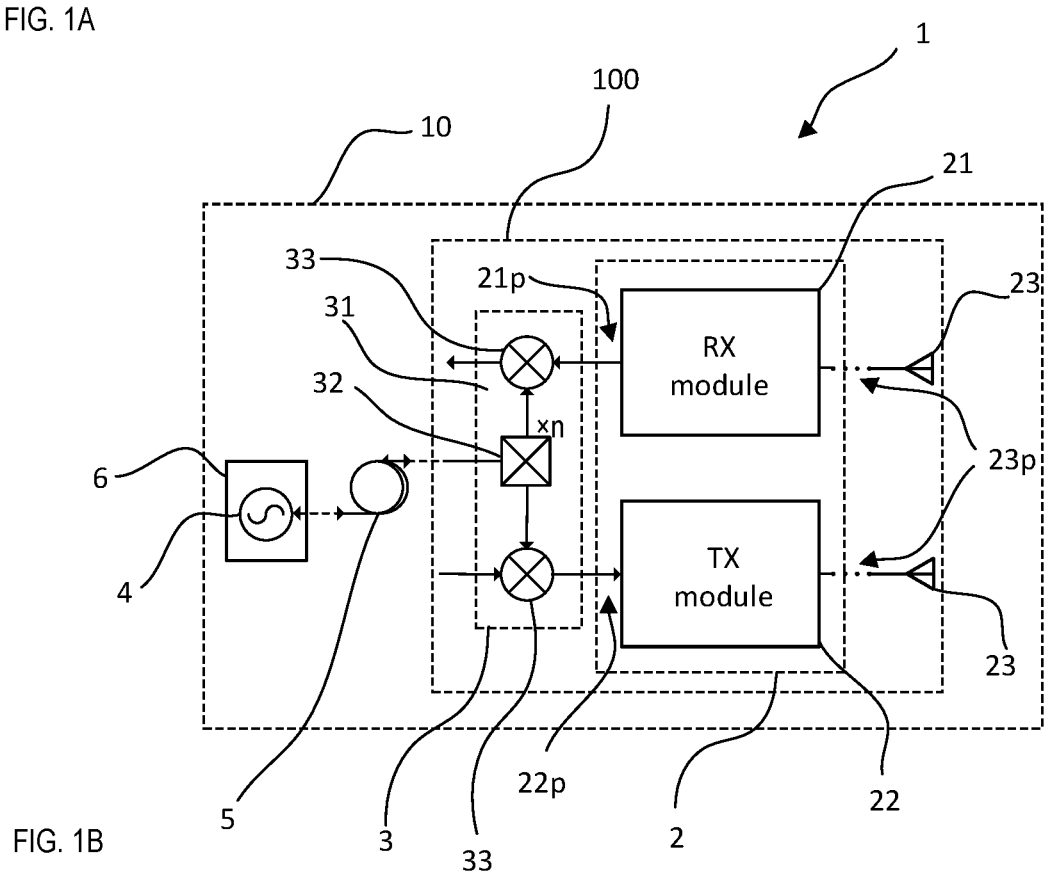

Aspects and various embodiments of the present disclosure will now be described more fully hereinafter with reference to the accompanying drawings. The different devices, systems, computer programs and methods disclosed herein can, however, be realized in many different forms and should not be construed as being limited to the aspects and embodiments set forth herein. Like numbers in the drawings refer to like elements throughout.

FIG. 1A shows a microwave radio system 1, according to one embodiment of the present disclosure. The microwave radio system 1 comprises at least one radio link 10 by way of example. The radio link 10, comprises at least one radio unit 100 according to one aspect of the present disclosure. In other embodiments such as the embodiments discussed in the following, the microwave system 1 may comprise a plurality of radio links, and each radio link may comprise one, or two, or three or multiple radio units. The radio unit 100 comprises a transceiver unit 2 which is configured to transmit and/or receive a wireless signal. The wireless signal in general is a signal which is propagated over the air as means to transfer the signal in a wireless communication system. The wireless signal may comprise the carrier signal and the data traffic or data stream which is to be transmitted and/or received by the radio units of the MIMO system.

Each transceiver unit 2 of the radio unit 100 comprises a receiving module 21, otherwise referred to as the RX module 21. The RX module 21 generally has a respective receiving port 21p, which couples the RX module 21 to other intermediate modules, units or network equipment in the radio system. The receiving port 21p is generally configured to transmit to the intermediate network equipment, the signals, such as wireless signals which are received by the RX module.

The transceiver unit 2, further comprises a transmitting module 22, otherwise referred to as the TX module 22. The TX module 22, generally has a respective transmitting port 22p, which couples the TX module 22 to other intermediate modules, units or network equipment in the radio system. The transmitting port 22p is generally configured to receive from the intermediate network equipment, the signals, such as wireless signals which are to be transmitted by the TX module. In several embodiments each radio unit 100, 100', 100" also comprises one or more antenna ports 23p. Different type of antennas may be coupled to the antenna ports 23p based on requirement and function of the radio units 100. Antenna arrangements may be mounted onto the radio units by means of a waveguide interface, or any other suitable means of connection. The radio unit 100, 100', 100" may also comprise a signal processing unit 3, which can be configured to process the wireless signal. In this embodiment the signal processing unit 3 is arranged to be operatively coupled to the respective receiving 21p and transmitting 22p ports of the receiving 21 and transmitting 22 modules of the transceiver unit 2. In other embodiments it may be readily contemplatable to arrange other intermediate entities and network equipment between the transceiver unit 2 and the signal processing unit 3. In the context of the present disclosure, the term coupled to and/or connected to is to be construed as operatively coupled to and/or operatively connected to. In several embodiments, the signal processing unit 3 comprises one or more frequency mixer elements 33 as shown in FIGS. 1A-E. The mixers 33 are generally operable to produce new output signals by operating on the two applied input signals of the mixer element. The produced output signals will thus have frequencies which have the sum, difference or multiplied frequencies of the original frequencies of the two applied input signals.

According to some embodiments, the signal processing unit 3 comprises at least one frequency multiplier element 32, 32', 32" as depicted in FIGS. 1B-E. The multiplier element 32, 32', 32" is generally configured to operate on the signals received by the multiplier element 32, 32', 32" such that at least a first signal is multiplied by a multiplication factor which can be a predetermined multiplication factor e.g. ×n or ×m of the multiplier element 32, 32', 32". The predetermined multiplication factor may comprise up/down-conversion values. The output signal i.e. the multiplied signal is therefore an up-converted signal or a down-converted signal of the originally received first signal with a multiplication factor of n or m. The multiplied output signal of the multiplier element 32, 32', 32" may be connected as an input signal to one or more other network entities. For instance, the multiplied signal may be connected to a modulator and/or demodulator unit 31 and/or to the mixer element 33 in the signal processing units 3. In other embodiments, mixer elements 33 may also comprise integrated multiplier elements 32, 32', 32" (not shown).

Figures 1C, 1D:
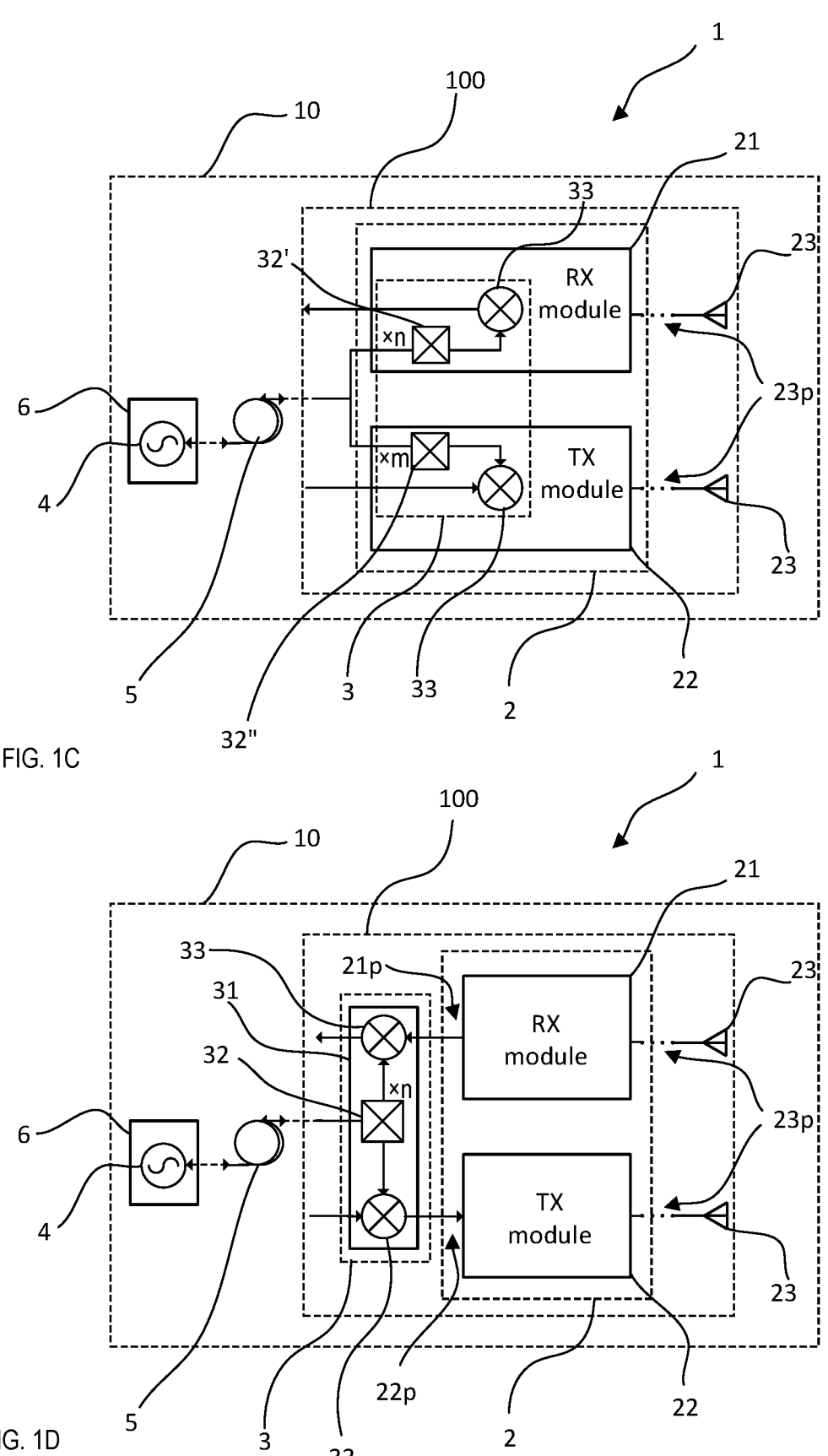

In some embodiments, the signal processing unit 3 may be fully or partially integrated in the transceiver unit 2 e.g. as shown in FIG. 1C, the mixer elements 33 and multiplier elements 32, 32', 32" are integrated in the receiving module 21 and/or the transmitting module 22. This way the integrated transceiver unit 2 is operable for both transmitting and/or receiving the signals and processing/operating on the transmitted and/or received signals. In several embodiments, the signal processing unit 3 may further comprise other elements such as power amplifiers (PAs) and/or low-noise amplifiers (LNA), and/or multiplexer/demultiplexer units, additional processing circuitry, storage mediums, etc.

In several embodiments as shown in FIG. 1D, the signal processing unit 3 may comprise a modulation and/or demodulation unit 31, configured to modulate and/or demodulate transmitted and/or received signals in the radio unit 100, 100', 100" of each radio link 10, 10', 10". In some embodiments the modulation and/or demodulation unit 31 further comprises at least one multiplier element 32, 32', 32" and/or one or more mixer elements 33 integrated therein. However, the multiplier element 32, 32', 32" and/or the mixer elements 33 can be arranged separately from the modulator and/or demodulator unit 31 of the signal processing unit 3.

The radio unit 100, 100', 100" is various embodiments comprises one or more antenna element(s)/antenna arrangements 23 for transmitting and/or receiving the wireless signals, wherein the antenna element 23 is arranged to be coupled to the antenna port 23$p$ of the transceiver unit 2. It is to be noted that in various implementations and examples in the present disclosure, the antenna element 23 may be integrated as a part of the radio unit 100, 100', 100" which means the antenna arrangements are deployed close to the radio units 100, 100', 100". This has the advantage of minimizing the power losses and reduces noise figures in high frequency operation of the MIMO system. Each of the RX 21 and/or TX modules 22 may be coupled to their designated antenna element 23, however in some embodiments an intermediate signal combiner (not shown) may be used to couple both the signals from the RX 21 and TX 22 modules to a common antenna arrangement 23 for each radio unit 100.

Moving on, in several embodiments each radio link 10, 10', 10" further comprises a common local oscillator, LO, 4, 4', 4" configured to transmit a common LO frequency signal of the LO to each of the radio units 100, 100', 100" of each radio link. The common LO 4, 4', 4" is normally deployed in a baseband unit 6 which may be comprised in the radio link 10, 10', 10". The baseband unit 6 and the LO 4, 4', 4" are preferably centralized units deployed remotely from the radio units 10, 10', 10". In addition to the LO frequency generation, the centralized baseband unit 6 may further comprise all the necessary signal processing units, such as modulators/demodulators, multiplexers/demultiplexers, mixers, filters, processing circuitry, storage medium, etc.

The above configuration has several advantages at high frequency operation of MIMO systems such as in transporting mm-wave signals. In conventional arrangements, waveguides or coaxial cables may be used to connect the antennas to the baseband unit including the LO which can impose very high losses, high phase noise figures and get very expensive in higher frequencies. However, in the present disclosure the baseband unit 6 including the common LO 4, 4', 4" can be deployed remotely from the radio units 100, 100', 100". Accordingly, by deploying the antenna element 23 collocated with the radio unit 100, 100', 100" as an active antenna arrangement, high radio frequencies can be generated with low phase noise and considerably low losses. High degree of synchronization can thus be achieved for all the MIMO links sharing the common LO 4, 4', 4" such that the phase noise over the different MIMO streams is correlated to a high degree. Frequency tuning of this common LO is also easier as the radio units sharing the common LO in the MIMO system will use the same carrier frequency. As a result, precoding can be efficiently applied for optimal deployment of MIMO antennas. The degree of phase noise correlation among the different MIMO streams depends on the link details such as MIMO order, baud rate, and phase noise strength. The required degree of phase noise correlation increases with the MIMO order and phase noise strength. If the phase noise is highly correlated between all streams, the total requirement on the phase noise will be comparable to a standard SISO-link, as opposed to unsynchronized MIMO, which has stringent phase noise requirements as the MIMO order increases.

Another benefit of this arrangement is that the system is less prone to losses and environmental noise e.g. mast vibrations, temperature fluctuations, etc. as the LO 4, 4', 4"

is located at a central location remote from the radio heads 100, 100', 100", which in turn results in improved maintenance of the system and lowers the associated costs. Additionally, since a common LO is deployed for multiple radio units, one could invest in a high performance, high quality LO e.g. a cavity oscillator designed for high phase noise performance which could be used for extended periods of time. Also, the radio unit can deliver a flexible range of frequencies without the need for replacement of common LO, but instead by replacing and/or adjusting the multiplier elements in the radio units. Further, the requirement of having designated high performance and possibly expensive voltage-controlled oscillators, phase locked loops and loop filters for suppression frequency comparison spurious or reference is relaxed for the radio units.

In some embodiments the common frequency signal of the LO 4, 4', 4" comprises a sub-harmonic frequency of the LO frequency. Compared to some conventional implementations wherein a reference signal may be shared among MIMO streams, sharing a common LO signal and specially a sub-harmonic signal of the LO is simpler than sharing a reference to fulfil a high correlation bandwidth. Sharing references only allows phase correlation down to the noise floor of the individual phase locked loop circuits in the radios and it will limit the correlation bandwidth to a very small portion. By sub-harmonic frequency of the LO it is meant an integer division ratio of the fundamental LO frequency of the common LO. The choice of sub-harmonic frequency is advantageous since by transmitting a lower frequency, low losses in the joint transmission line e.g. IF cables can be realized. Further, frequency multiplier elements maintain the phase noise correlation in the radio units. The choice of frequency on the sub-harmonic is dependent of the RF-frequency raster and frequency planning for required performance of the MIMO links. When referring to the common frequency of the LO in this disclosure, it is meant to include also the embodiments where the sub-harmonic frequency of the LO is being transmitted and used.

In several embodiments a respective joint transmission line 5 is arranged to be coupled to each respective radio unit 100, 100', 100" and is configured to carry a plurality of signals comprising the common LO frequency signal or the sub-harmonic frequency of the common LO 4, 4', 4" to each of the respective radio units of each radio link 10, 10', 10". The signals are frequency multiplexed and separated through filter units (see e.g. FIGS. 2A and 2B), before they are combined to the joint transmission line 5 coupled to each radio unit. One single transmission line may be used per radio unit, as the different RX/TX IF streams are to be separated to the signal processing units in the central baseband unit 6. As mentioned earlier, the common LO is preferably arranged remotely from the one or more radio units of each radio link. The respective joint transmission line 5, is further configured to carry a data stream transmitted from the baseband unit 6 towards each of the one or more radio unit(s) 100, 100', 100". The data stream generally is an intermediate frequency (IF) signal which carries the data to be transmitted to the transmitter modules 22 (TXIF). Further the joint transmission line 5 is configured to carry the data stream (RXIF signals transmitted from the receiving modules 21 toward the baseband unit 6) which is received from each of the one or more radio unit(s) 100, 100', 100" at the baseband unit 6. The respective joint transmission line 5 may be any IF cable such as a conventional coaxial cable suitable for transmitting carrier signals over a distance according to the characteristics and functions of the radio links. IF cables with different lengths could be used e.g.

cables having a length in the range between 0.5 meters and 500 meters. The respective joint transmission line 5, may be further configured to carry a power signal and/or a control signal from the baseband unit 6 to each of the one or more radio unit(s) 100, 100', 100". The power signal may be a direct current (DC) signal to power the equipments in the radio units. The inventors have found that by using a common transmission line for transmitting the common LO signal, the data stream and power signals to and/or from the radio and baseband units a high degree of simplicity and flexibility is achieved in MIMO deployment while delivering highly synchronized radio links and further saving costs on eliminating implementation of multiple transmission lines.

Figure 1E:
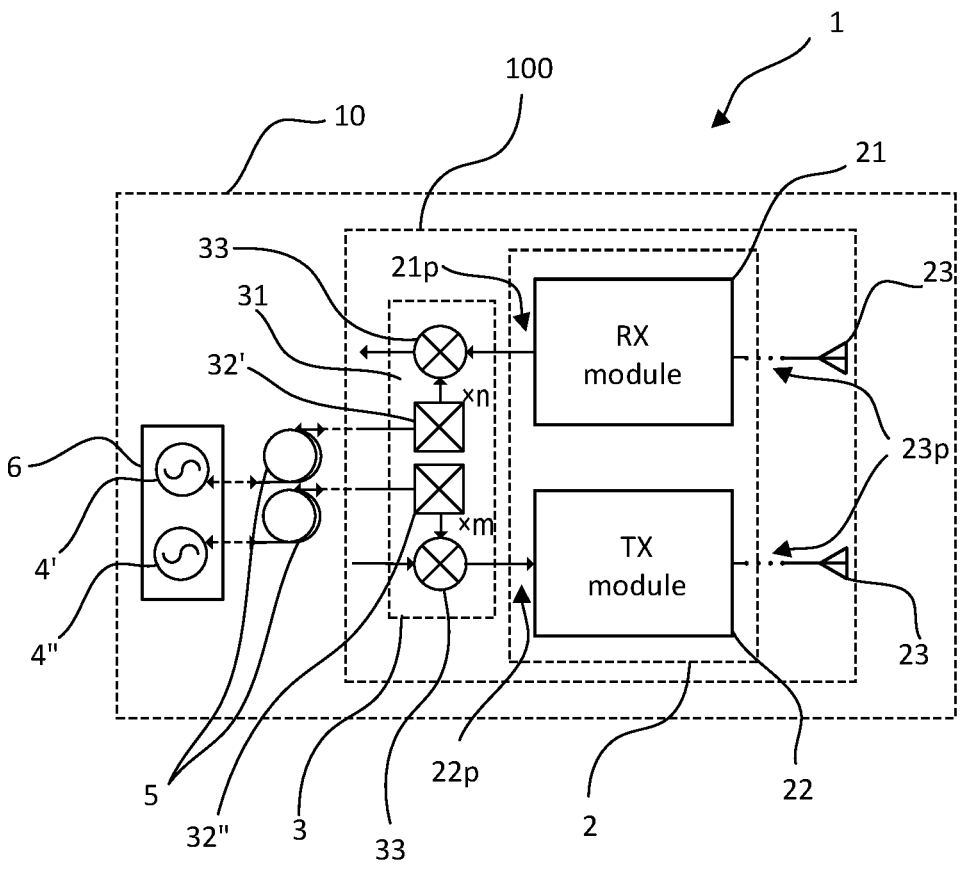

Moving on, as shown in FIG. 1E, in some embodiments, each of the RX 21 and the TX 22 modules may have their own designated common LO 4', 4". This provides for a higher degree of flexibility in controlling the frequency of the common Los 4', 4" for the receiving 21 and transmitting 22 modules. 1. Thus, each radio link 10, 10" may comprise the first common LO 4', and the second common LO 4", wherein the first common LO 4' is a receiver common LO having a first common LO frequency for the received signal and the second common LO 4" is a transmitter common LO having a second common LO frequency for the transmitted signal, wherein the first common LO frequency is different from the second common LO frequency. In several embodiments the multiplication factor of the multiplier elements 32', 32" may also be different for the first common LO 4' and the second common LO 4". Stated otherwise, each radio unit 100, 100', 100" may further comprise a first multiplier element 32', and a second multiplier element 32", wherein the first multiplier element is a receiver multiplier element 32', configured to operate on the first common LO frequency of the first common LO 4' for the received signal and the second multiplier element is a transmitter multiplier element 32", configured to operate on the second common LO frequency of the second common LO 4" for the transmitted signal. It should also be appreciated that in some embodiments e.g. as shown in FIG. 1C or 2A, when using a shared common LO 4 for both of the received and transmitted signals in the RX 21 and TX 22 modules, the first multiplier element 32' and the second multiplier element 32" having different multiplication factors can still be used to generate the proper working frequency of the radio units 100, 100'.

Further, each radio unit 100, 100', 100" is configured to receive (e.g. at the multiplier elements 32, 32', 32") and convert the transmitted common frequency signal of the common LO, to an operational radio frequency of each radio link. Thereafter, the signal processing unit 3 e.g. the frequency mixer elements 33 are configured to produce an output signal based on the operational radio frequency (up-converted and/or down-converted frequency of the common LOs 4, 4', 4") of each radio link. The mixer elements 33 operate on the received wireless signal by the RX module 21 and produce a RXIF which will be sent to the baseband unit 6 via the joint transmission line 5. Similarly, by operating on the operational frequency of the radio link and the TXIF signal received from the baseband unit 6, the mixer elements 33 produce an output signal which is to be transmitted wirelessly by the TX module 22.

Figures 2A, 2B:
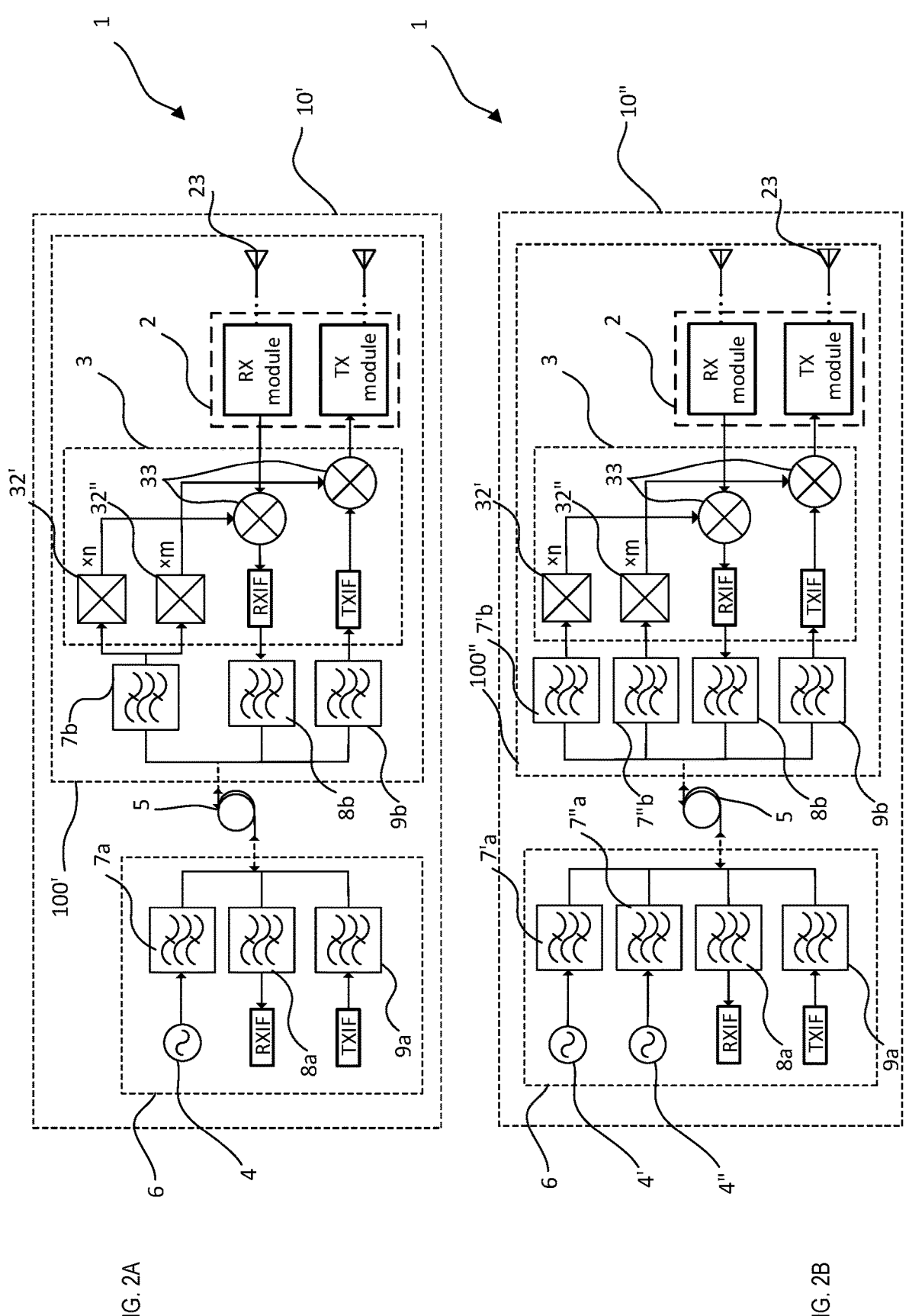
FIGS. 2A-2B show schematic diagrams of the microwave radio system according to some other embodiments of the present disclosure.

FIGS. 2A and 2B illustrate example radio systems 1 according to several aspects of the present disclosure. The embodiment of FIG. 2A comprises the radio unit 100' and the embodiment of FIG. 2B comprises the radio unit 100". The items such as different hardware (mixers, multiplier elements, etc.), configurations, functionality of the items and advantages achieved which are explained with respect to FIGS. 1A-1E congruently apply with respect to the embodiments of FIGS. 2A-2B. Therefore, additional explanation of various items already explained has been avoided with respect to FIGS. 2A-2B for the sake of brevity. The centralized baseband units 6 may further comprise at least one filter unit 7a, 7'a, 7"a, configured to separate the common frequency signal of the common LO 4, 4', 4" from the plurality of other signals (e.g. RXIF, TXIF, DC power signal, etc.) being carried by the joint transmission line 5 toward and/or from the radio units 100, 100', 100". In FIG. 2A, there is a common LO 4 deployed in the baseband unit 6. This common LO 4 is shared between the RX 21 and TX 22 modules of the radio unit 100' and the common LO frequency is being filtered through filter 7a in the baseband unit 6. However, to construct the proper working frequency for the RX and TX modules in the radio units 100', different multiplier elements 32', 32" with different multiplication factors (n and m) are deployed in the radio units 100'. In addition, in some embodiments the IF signals of the RX and TX may differ and chosen among a variety of frequencies based on the desired function. For example, the IF signal for the transmission (TXIF) may be 500 MHz, or 1 GHz and the IF signal for the reception (RXIF) may be 2 GHz or 3 GHz. The common LO signal is also chosen based on the desired function and characteristics of the radio links and in some examples may be 10 GHz or 11 GHz for both or either one of the TX and RX modules. In different embodiments, such as the embodiment of FIG. 2B, each of the RX and TX modules may have their own designated common LO 4', 4" in the baseband unit 6. In other words, all the RX modules in the one or more radio units comprised in the radio link may share a common LO 4'. Similarly, all the TX modules in one or more radio units of the radio link may share their own common LO 4". It should be appreciated that any other combinations of arranging the common LOs in the baseband unit and each of the radio units depending on the requirements and functions of the radio units is conceivable. For instance, in some embodiments the common LO may only be used for synchronization of the TX modules and the RX modules may operate on a free-running setting without any shared common LO signal which is synchronized. In another example, TX modules of a first group of radio units in a radio link may share a common LO with a first frequency, whereas the TX modules of a second group of radio units in the same link share a common LO with a second frequency. In yet another example, RX modules of a first group of radio units in a radio link may share a common LO with a first frequency, whereas the RX modules of a second group of radio units in the same link share a common LO with a second frequency. Accordingly each radio unit 100', 100" also comprises at least one filter unit 7b, 7'b, 7"b, corresponding to the at least one filter unit 7a, 7'a, 7"a of the baseband unit 6, configured to separate the common frequency signal of the common LO 4, 4', 4" from the plurality of signals being carried by the joint transmission line 5 toward and/or from the radio units.

Furthermore, the baseband unit 6 also comprises at least one receiver filter unit 8a and at least one transmitter filter unit 9a. The transmitter filter 9a is configured to separate from the plurality of signals being carried by the joint transmission line 5, the data stream transmitted (TXIF) from the baseband unit 6 towards each of the one or more radio unit(s) 100', 100". This data stream will be mixed by the mixer elements 33 of the radio units 100', 100" and transmitted as the wireless signal by the antenna elements 23 coupled to the TX modules 22. Similarly, the receiver filter unit 8a is configured to separate from the plurality of signals being carried by the joint transmission line 5, the data stream received (RXIF) from each of the one or more radio unit(s) 100', 100" at the baseband unit 6. Accordingly, each radio unit 100', 100" may comprise at least one receiver filter unit 8*b* and at least one transmitter filter unit 9*b*, corresponding to the at least one receiver filter unit 8*a* and the at least one transmitter filter unit 9*a* of the baseband unit 6. The transmitter filter unit 9*b* is configured to separate from the plurality of signals being carried by the joint transmission line 5, the data stream (TXIF), received from the baseband unit 6 at each of the one or more radio unit(s) 100', 100". Here the received data stream at each radio unit 100', 100" is the data stream (TXIF) which is arranged to be transmitted wirelessly by the antenna elements 23 of the radio units 100', 100". The TXIF signal will be mixed at the mixer elements 33 with the operational frequency of the radio units and then be transmitted by the antenna elements 23. Similarly, the receiver filter unit 8*b* is configured to separate from the plurality of signals being carried by the joint transmission line 5, the data stream (RXIF), transmitted from each of the one or more radio unit(s) 100', 100" toward the baseband unit 6. Here the transmitted data stream from each radio unit 100', 100" toward the baseband unit 6 is the data stream (RXIF) which has been received wirelessly by the antenna elements 23 at the radio units 100', 100" and after being mixed at the mixer elements 33 to the IF signal (RXIF) is transferred to the baseband unit 6.

Figure 3:
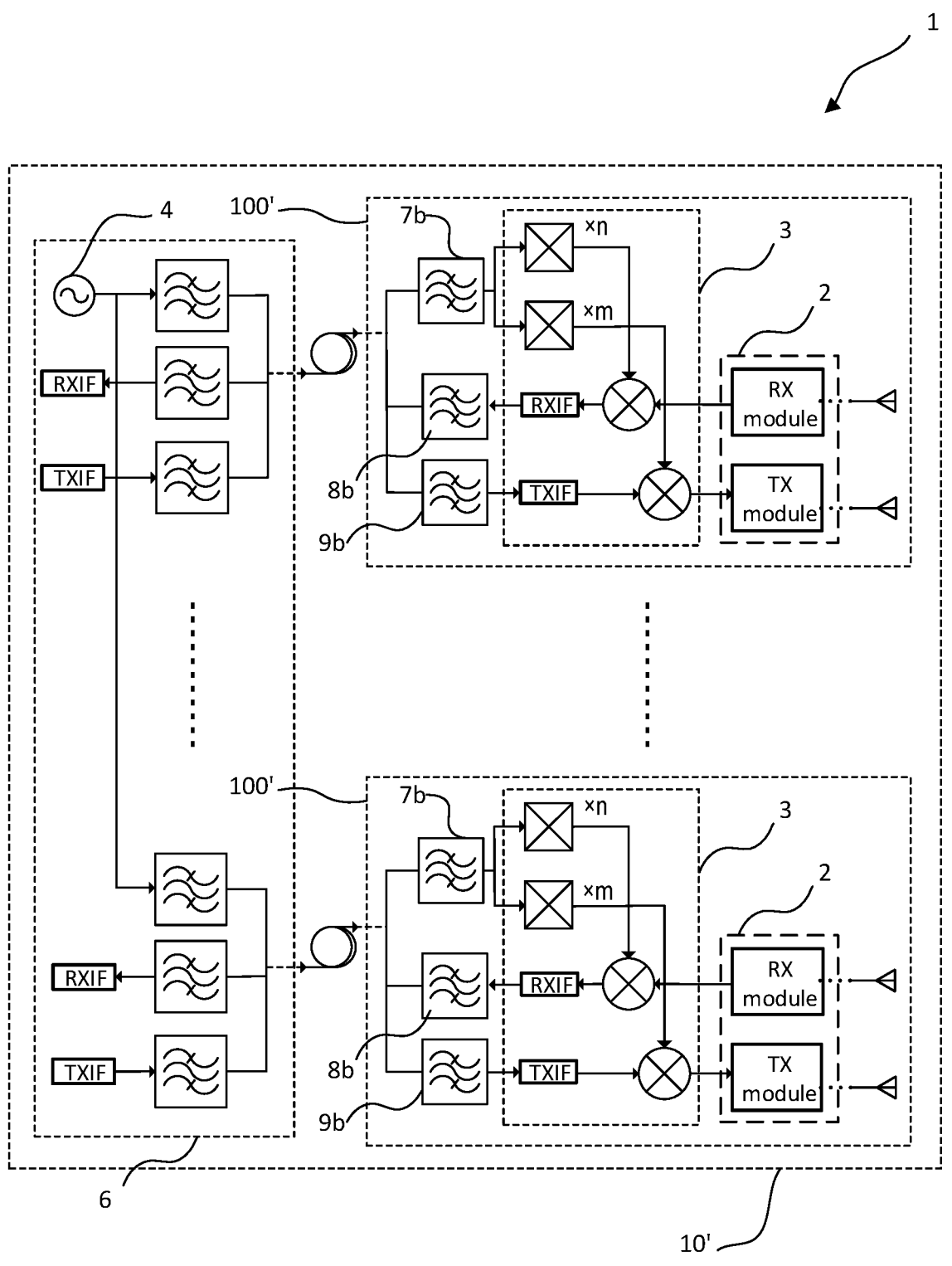
FIG. 3 illustrates a schematic diagram of a microwave radio system comprising a plurality of radio units according to some embodiments of the present disclosure.
Figure 4:
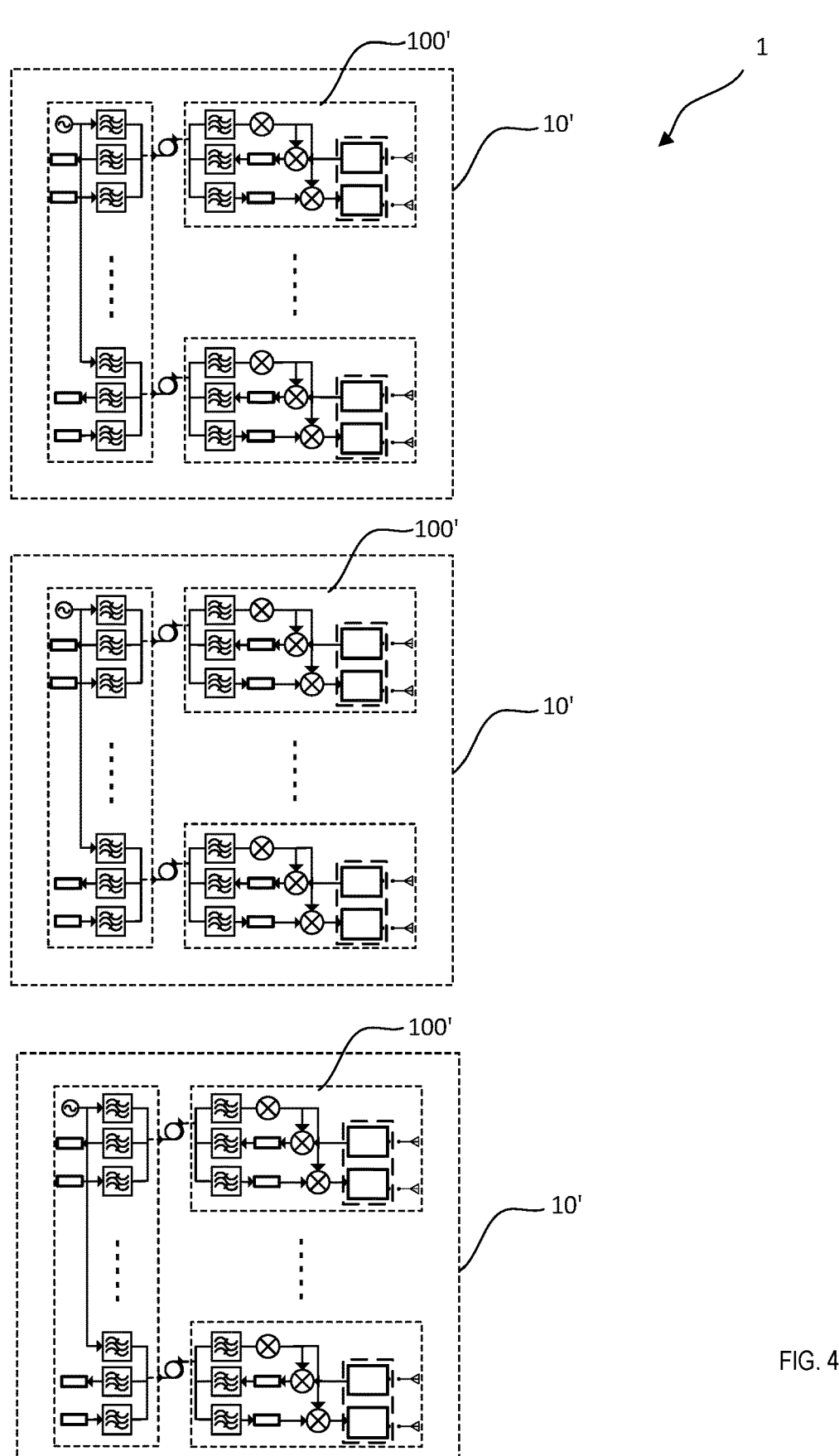
FIG. 4 illustrates a schematic diagram of a multi-link microwave radio system comprising a plurality of radio links according to some embodiments of the present disclosure.

Moving on to FIG. 3, a schematic diagram of a microwave radio system 1 according to some embodiments is illustrated. The microwave radio system 1 may for example be a line-of-sight, LOS, multi-stream multi-input multi-output, MIMO microwave backhaul communication system. Here the radio link 10' is shown by way of example, wherein the radio link 10' comprises a plurality of radio units 100'. The radio link 10' may in some embodiments comprise two, three, four, or more radio units 100'. Accordingly, the MIMO system 1 may be a 2×2 MIMO, or a 4×4 MIMO or be of any other MIMO order. Even though the radio units 100' shown in the radio link 10' are all alike with a common LO 4 used for all the TX and RX modules of all radio units, it should be appreciated that various implementations of radio units in each radio link is readily possible. For example, each radio link may comprise different configurations of radio units with respect to the common LOs and signal processing units including the configuration of mixers, multiplier elements, multiplication factors, IF signals, etc. As a way of example, the radio link 10' may comprise a plurality of radio units 100' illustrated in FIG. 2A with a corresponding common LO 4 as well as a plurality of radio units 100" illustrated in FIG. 2B with corresponding common LOs 4', 4" implemented in the baseband unit 6. The same applies for the configuration of the filter units both in the baseband unit 6 and the radio units 100'. In other words, the configuration of filter units may be adapted based on the configuration of LO signals, TXIF signals, RXIF signals, power signals and the like. Furthermore, with reference to FIG. 4, the microwave radio system 1 may comprise a plurality of radio links 10' as discussed above. In other embodiments, the radio system 1 may comprise various configurations including implementations of different radio links 10, 10', 10" within the radio system 1.

Figure 5:
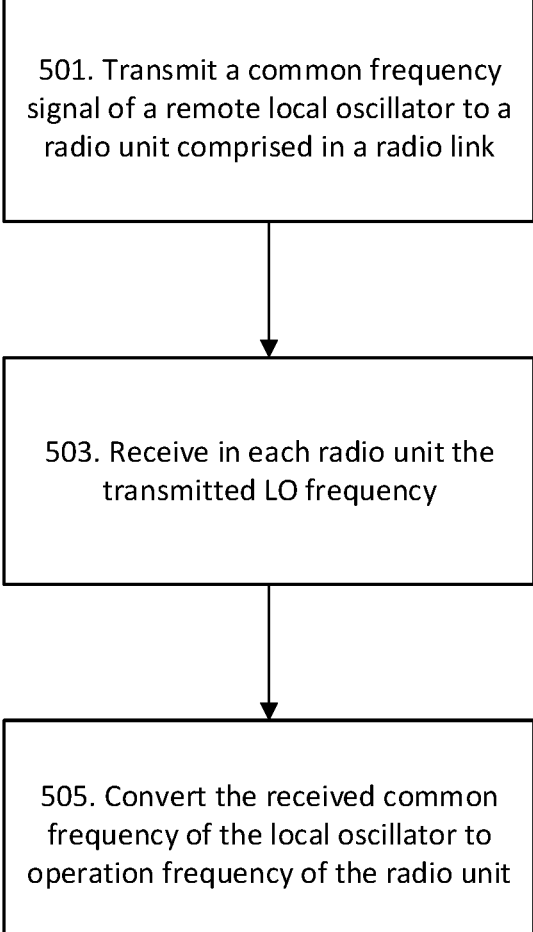
FIG. 5 shows a flowchart of a method according to embodiments of the present disclosure.

FIG. 5 shows a flowchart of a method according to another aspect of the present disclosure. The method may be carried out by different entities of the microwave radio system 1, such as the centralized baseband units 6, local oscillators 4, 4', 4", and the radio units 100, 100', 100", which are operable to perform several steps of the method in any desirable order. The method in step 501 comprises transmitting a common frequency signal of a remote local oscillator generated by the common LO to a radio unit 100, 100', 100" comprised in a radio link 10, 10', 10". In step 503, the transmitted LO signal is received in each radio unit and subsequently in step 505 is converted to an operational frequency of the radio unit.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The various entities of the microwave communication system such as the baseband units, and radio units may additionally comprise processing circuitry and at least one storage medium e.g. a memory. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A microwave multiple-input, multiple-output (MIMO) radio system, comprising:

at least one radio link, the at least one radio link comprising:

one or more radio units, the one or more radio units comprising:

a transceiver unit configured to one or both transmit and receive a wireless signal, the transceiver unit comprising:

a receiving (RX) module, and a transmitting (TX) module;

a signal processing unit operatively coupled to the transceiver unit to process the wireless signal from one or both of the RX module and the TX module of the transceiver unit; and one or more antenna arrangements for one or both of transmitting and receiving the wireless signal, the one or more antenna arrangements coupled to an antenna port of the transceiver unit;

the at least one radio link further comprising:

a baseband unit comprising at least one filter unit;

a common local oscillator (LO) arranged in the baseband unit to generate a common LO frequency signal, the baseband unit to transmit the common LO frequency signal from the baseband unit to each of the one or more radio units of the at least one radio link; and a respective joint transmission line arranged to couple the baseband unit with the common LO deployed therein to each respective radio unit and to carry from the baseband unit a plurality of signals comprising the common LO frequency signal of the common LO to each of the one or more respective radio units of the at least one radio link, the respective joint transmission line being further configured to carry a transmit intermediate frequency (IF) signal from the baseband unit towards the TX module and to carry a receive IF signal from the RX module towards the baseband unit, the baseband unit with the common LO deployed therein being arranged remotely from the one or more radio units of the at least one radio link and the one or more radio units being configured to receive and convert the transmitted common LO frequency signal to an operational radio frequency of the one or more radio units.

2. The microwave radio system according to claim 1, wherein the signal processing unit further comprises at least one frequency mixer element configured to produce an output signal based on the operational radio frequency of each radio unit.

3. The microwave radio system according to claim 1, wherein the signal processing unit further comprises at least one multiplier element configured to multiply the common frequency signal of the common LO by a predetermined multiplication factor.

4. The microwave radio system according to claim 3, wherein each radio unit further comprises a first multiplier element, and a second multiplier element, wherein the first multiplier element is a receiver multiplier element, configured to operate on the first common LO frequency of the first common LO for the received signal and the second multiplier element is a transmitter multiplier element, configured to operate on the second common LO frequency of the second common LO for the transmitted signal, wherein the first common LO frequency is different from the second common LO frequency.

5. The microwave radio system according to claim 1, wherein the common frequency signal of the common LO comprises a sub-harmonic frequency of the LO frequency.

6. The microwave radio system according to claim 1, wherein the signal processing unit further comprises a modulation/demodulation unit, configured to one or both modulate and demodulate one of both transmitted and received signals in each radio unit.

7. The microwave radio system according to claim 1, wherein the respective joint transmission line, is further configured to carry one or both of a power signal and a control signal to each of the one or more radio units.

8. The microwave radio system according to claim 1, wherein the respective joint transmission line, is further configured to carry a data stream one or both of transmitted from the baseband unit towards each of the one or more radio units and received from each of the one or more radio unit(s) at the baseband unit, wherein the respective joint transmission line is an intermediate frequency (IF) cable.

9. The microwave radio system according to claim 1, wherein the at least one filter unit is configured to separate the common frequency signal of the common LO from the plurality of signals being carried by the joint transmission line.

10. The microwave radio system according to claim 1, wherein the baseband unit further comprises at least one receiver filter unit and at least one transmitter filter unit, wherein the receiver filter unit is configured to separate, from the plurality of signals carried by the joint transmission line, the data stream received from each of the one or more radio unit(s) at the baseband unit and wherein the transmitter filter unit is configured to separate, from the plurality of signals carried by the joint transmission line, the data stream transmitted from the baseband unit toward each of the one or more radio unit(s).

11. The microwave radio system according to claim 1, wherein the at least one filter unit corresponds to at least one filter unit of the baseband unit and configured to separate the common frequency signal of the common LO from the plurality of signals being carried by the joint transmission line.

12. The microwave radio system according to claim 1, wherein each radio unit further comprises at least one receiver filter unit and at least one transmitter filter unit corresponding to at least one receiver filter unit and at least one transmitter filter unit of the baseband unit, wherein a receiver filter unit of a radio unit is configured to separate, from the plurality of signals carried by the joint transmission line, the data stream transmitted from each of the one or more radio units toward the baseband unit, and wherein a transmitter filter unit of a radio unit is configured to separate, from the plurality of signals carried by the joint transmission line, the data stream received from the baseband unit at each of the one or more radio units.

13. The microwave radio system according to claim 1, wherein each radio link comprises a first common LO, and a second common LO, wherein the first common LO is a receiver common LO having a first common LO frequency for the received signal and the second common LO is a transmitter common LO having a second common LO frequency for the transmitted signal, wherein the first common LO frequency is different from the second common LO frequency.

14. The microwave radio system according to claim 1, wherein the microwave radio system is a line-of-sight (LOS) multi-stream multi-input multi-output, MIMO microwave backhaul communication system.

15. A radio unit of a microwave Multiple-Input-Multiple-Output (MIMO) system, the radio unit comprising:

a transceiver unit configured to one or both transmit and receive a wireless signal, the transceiver unit comprising:

a receiving (RX) module, a transmitting (TX) module, and an antenna port;

a signal processing unit operatively coupled to the transceiver unit to process the wireless signal from one or both of the RX module and the TX module of the transceiver unit;

an antenna arrangement for one or both transmitting and receiving the wireless signal, the antenna arrangement coupled to the antenna port of the transceiver unit;

the radio unit of the microwave MIMO system being arranged remotely from a baseband unit, the baseband unit including at least one filter unit, and a common local oscillator (LO) deployed therein to generate a common LO frequency signal, and the radio unit being arranged to be coupled to a joint transmission line, and configured to receive the common LO frequency signal from the common LO of the baseband unit via said joint transmission line, the joint transmission line being further configured to carry a transmit intermediate frequency, IF, signal from the baseband unit to the TX module and carry a receive IF signal from the RX module to the baseband unit; and the signal processing unit of the radio unit being configured to convert the received common LO frequency signal from the common LO of the baseband unit to an operational radio frequency of the radio unit.

16. A method for generating an operational radio frequency in a microwave multiple-input, multiple-output (MIMO) radio system, the method comprising:

transmitting, over a respective joint transmission line coupled to respective radio units, a common local oscillator (LO) frequency signal generated by a common LO deployed in a baseband unit remotely located from the respective radio units of a MIMO radio link, the baseband unit comprising at least one filter unit, each of the respective radio units comprising:

a transceiver unit to one or both transmit and receive a wireless signal;

a signal processing unit operatively coupled to the transceiver unit to process the wireless signal from one or both of the RX module and the TX module; and one or more antenna arrangements for one or more of transmitting and receiving the wireless signal, the one or more antenna arrangements coupled an antenna port of the transceiver unit, each respective joint transmission line being further configured to carry a transmit intermediate frequency, IF, signal from the baseband unit to a transmitting (TX) module of the transceiver unit, and to carry a receive IF signal from the receiving (RX) module of the transceiver unit to the baseband unit;

receiving, in each radio unit, the transmitted common LO frequency signal of the common LO of the baseband unit; and converting, in each radio unit, the received common LO frequency signal of the common LO to the operational radio frequency of each radio unit.

17. The method according to claim 16, wherein the common frequency signal of the common LO comprises a sub-harmonic frequency of the LO frequency.

18. The method according to claim 16, wherein converting the received common frequency of the common LO to the operational frequency of each radio unit comprises:

multiplying the received common frequency signal of the common LO by a predetermined multiplication factor.

19. The method according to claim 18, wherein the predetermined multiplication factor is determined based on at least one of: radio link operation frequency, degree of phase noise correlation of the at least one radio link, the MIMO order, baud rate and phase noise strength of the microwave radio system.

* * * * *